UNITED STATES PATENT OFFICE.

GUSTAF HENRIK HULTMAN, OF STOCKHOLM, SWEDEN.

PROCESS FOR MANUFACTURING CHROME ALUM.

1,343,725.  Specification of Letters Patent.  Patented June 15, 1920.

No Drawing.  Application filed November 11, 1919. Serial No. 337,198.

*To all whom it may concern:*

Be it known that I, GUSTAF HENRIK HULTMAN, a subject of the King of Sweden, residing at Stockholm, Sweden, have invented new and useful Improvements in Processes for Manufacturing Chrome Alum, of which the following is a specification.

Chrome alum is usually manufactured in the following manner: Chrome ore is heated in a reverberatory furnace, together with carbonate of potassium and lime, air being plentifully supplied. The material having been boiled with water, potassium chromate is the first product obtained. The chromate is then converted into bichromate, and the latter to chrome alum by reduction with sulfurous acid in a sulfuric acid solution. Thus quite a number of processes have to be performed. The reaction of the material in a reverberatory furnace necessitates persistent agitation and a lengthy heating period, if a satisfactory output is to be obtained.

A much simpler and more rapid method of manufacture is obtained if one uses as a basic material ferro-chrome produced in an electric furnace, dissolves the latter in sulfuric acid, and adds to that solution a soluble salt of potassium, for example potassium sulfate or potassium chlorid, when pure chrome alum will be crystallized out. If the ferro-chrome is ground down to a very fine powder, and care is taken that the material is well heated and stirred, the inventor has found that the entire content of iron and chromium in the ferro-chrome is dissolved in the course of two to three days, on a manufacturing scale, even if laboratory tests have given a less satisfactory result.

The solution consists of a mixture of chiefly ferrous-sulfate and chromic sulfate. The content of iron can be reduced by the direct crystallizing-out of the ferrous-sulfate. Half the content of iron can be eliminated in this way without difficulty. In order to obtain pure chrome alum it is not, however, necessary first to reduce the content of iron. By the addition of a soluble potassium salt to the chromium sulfate solution, pure chrome alum is crystallized out, whether the content of iron has previously been reduced or not, but in the latter case the output will be smaller.

It has been ascertained by experiment that the solution of ferro-chrome in sulfuric acid proceeds much more rapidly in leaden vessels than in other vessels, whence it is advantageous to make the said solution in the presence of lead.

What I claim is:

1. Process for manufacturing chrome alum, characterized by the fact that ferro-chrome is dissolved in sulfuric acid and that a soluble potassium salt is added to that solution.

2. Process as stated in claim 1, characterized by the fact that before the addition of a soluble potassium salt, part of the content of iron is removed by crystallization.

3. Process as stated in claim 1, characterized by the fact that the solution of the ferro-chrome in sulfuric acid takes place in the presence of lead.

In testimony whereof I have signed my name to this specification.

GUSTAF HENRIK HULTMAN.